US011378047B2

United States Patent
Hemphill

(10) Patent No.: US 11,378,047 B2
(45) Date of Patent: Jul. 5, 2022

(54) TWO-SPEED ACCESSORY DRIVE WITH INTEGRATED MOTOR-GENERATOR

(71) Applicant: Schaeffler Technologies AG & Co. KG, Herzogenaurach (DE)

(72) Inventor: Jeffrey Hemphill, Copley, OH (US)

(73) Assignee: SCHAEFFLER TECHNOLOGIES AG & CO. KG, Herzogenaurach (DE)

( * ) Notice: Subject to any disclaimer, the term of this patent is extended or adjusted under 35 U.S.C. 154(b) by 240 days.

(21) Appl. No.: 16/735,392

(22) Filed: Jan. 6, 2020

(65) Prior Publication Data
US 2021/0207568 A1 Jul. 8, 2021

(51) Int. Cl.
| F02N 11/00 | (2006.01) |
| F02N 11/04 | (2006.01) |
| F16H 3/46 | (2006.01) |
| B60K 25/00 | (2006.01) |

(52) U.S. Cl.
CPC ............ *F02N 11/003* (2013.01); *B60K 25/00* (2013.01); *F02N 11/04* (2013.01); *F16H 3/46* (2013.01)

(58) Field of Classification Search
CPC ...... F02N 11/003; F02N 11/04; F02N 15/046; F16H 3/46; F16H 3/54; F16H 2200/0034; F16H 2200/2005; F16H 2200/2035; F16H 2200/2082; F16H 2200/2066; B60K 25/00; B60K 25/02; B60K 2025/022; B60K 2025/005; F02B 67/04; B60Y 2300/1886; B60Y 2400/47; B60Y 2400/73
See application file for complete search history.

(56) References Cited

U.S. PATENT DOCUMENTS

| 5,558,173 | A | * | 9/1996 | Sherman | B60W 10/06 903/910 |
| 6,019,183 | A | * | 2/2000 | Shimasaki | B60W 10/08 903/917 |
| 6,554,113 | B2 | * | 4/2003 | Li | F16D 7/027 192/56.6 |
| 7,582,034 | B2 | * | 9/2009 | Usoro | B60K 25/02 475/5 |
| 7,631,719 | B2 | * | 12/2009 | Wenthen | B60K 6/48 180/53.6 |
| 8,479,847 | B2 | * | 7/2013 | Hart | B60K 6/485 180/65.265 |
| 10,203,005 | B2 | * | 2/2019 | Wilton | F16D 25/0638 |
| 10,449,855 | B2 | * | 10/2019 | Girard | B60K 17/28 |

(Continued)

*Primary Examiner* — Phutthiwat Wongwian
*Assistant Examiner* — Sherman D Manley
(74) *Attorney, Agent, or Firm* — Volpe Koenig

(57) ABSTRACT

An accessory drive, including a planetary gear set with a plurality of components arranged to be concentrically disposed around a crankshaft of an internal combustion engine. The plurality of components includes: a sun gear; a planet carrier; a ring gear; and a planet gear meshed with the sun gear and the ring gear. A first component of the planetary gear set: is arranged to non-rotatably connect to a rotor of an electric motor/generator; and is arranged to connect to a power transfer component for least one accessory. A second component of the planetary gear set is arranged to non-rotatably connect to the crankshaft. For a starting mode of the accessory drive, the electric motor/generator is arranged to: rotate the first component of the planetary gear set; and rotate the second component of the planetary gear set with respect to the first component of the planetary gear set.

20 Claims, 2 Drawing Sheets

(56) References Cited

U.S. PATENT DOCUMENTS

| | | | | |
|---|---|---|---|---|
| 10,676,079 B1* | 6/2020 | Bucknor | ................ | B60W 20/10 |
| 2004/0060535 A1* | 4/2004 | Osawa | ................... | B60W 10/06 |
| | | | | 123/481 |
| 2004/0153234 A1* | 8/2004 | Mogi | .................... | B60W 10/06 |
| | | | | 123/316 |
| 2005/0101425 A1* | 5/2005 | Yamauchi | ........... | B60L 15/2054 |
| | | | | 903/910 |
| 2008/0280726 A1* | 11/2008 | Holmes | ................... | B60K 6/383 |
| | | | | 180/65.265 |
| 2009/0314559 A1* | 12/2009 | Palitto | ................... | B60W 10/30 |
| | | | | 477/3 |
| 2014/0290406 A1* | 10/2014 | Hemphill | ................ | F02B 67/04 |
| | | | | 74/405 |
| 2018/0363544 A1* | 12/2018 | Zanzig | .................... | F02B 67/04 |
| 2019/0070955 A1* | 3/2019 | Lee | ........................ | B60K 23/04 |
| 2020/0300346 A1* | 9/2020 | Ziech | .................... | H02K 7/116 |
| 2021/0054911 A1* | 2/2021 | Kruse | .................... | B60K 6/445 |
| 2021/0252972 A1* | 8/2021 | Engerman | .............. | B60K 17/02 |

* cited by examiner

US 11,378,047 B2

TWO-SPEED ACCESSORY DRIVE WITH INTEGRATED MOTOR-GENERATOR

TECHNICAL FIELD

The present disclosure relates to accessory drives

BACKGROUND

Two-speed drives for engine accessories are known. Known two-speed drives using a belt starting alternator enable accessories to be driven by a motor-generator when the engine is off. However, belt starting alternators require the use of costly and complex belt drives and associated tensioners.

SUMMARY

According to aspects illustrated herein, there is provided an accessory drive, including: an electric motor/generator including a rotor; and a planetary gear set including a plurality of components arranged to be concentrically disposed around a crankshaft of an internal combustion engine. The plurality of components includes: a sun gear; a planet carrier; a ring gear; and a planet gear meshed with the sun gear and the ring gear. A first component of the planetary gear set, included in the plurality of components: is non-rotatably connected to the rotor; and is arranged to connect to a power transfer component for least one accessory. A second component of the planetary gear set, included in the plurality of components, is arranged to non-rotatably connect to the crankshaft. For a starting mode of the accessory drive, the electric motor/generator is arranged to: rotate the first component of the planetary gear set; and rotate the second component of the planetary gear set with respect to the first component of the planetary gear set.

According to aspects illustrated herein, there is provided an accessory drive, including: an electric motor/generator including a rotor; and a planetary gear set arranged to be concentrically disposed around a crankshaft of an internal combustion engine, the planetary gear set including: a sun gear; a planet carrier arranged to non-rotatably connect to the crankshaft; a ring gear meshed with the planet carrier, non-rotatably connected to the rotor, and arranged to connect to a power transfer component for least one accessory; and a planet gear meshed with the sun gear and the ring gear. For a starting mode of the accessory drive the electric motor/generator is arranged to: rotate the ring gear at a first rotational speed; and rotate the planet carrier at a second rotational speed, different from the first rotational speed.

According to aspects illustrated herein, there is provided an accessory drive, including: an electric motor/generator including a rotor; and a planetary gear set arranged to be concentrically disposed around a crankshaft of an internal combustion engine, the planetary gear set including: a sun gear non-rotatably connected to the rotor and arranged to connect to a power transfer component for least one accessory; a planet carrier arranged to non-rotatably connect to the crankshaft; a ring gear meshed with the planet carrier; and a planet gear meshed with the sun gear and the ring gear. For a starting mode of the accessory drive, the electric motor/generator is arranged to: rotate the sun gear at a first rotational speed; and rotate the planet carrier at a second rotational speed, different from the first rotational speed.

BRIEF DESCRIPTION OF THE DRAWINGS

Various embodiments are disclosed, by way of example only, with reference to the accompanying schematic drawings in which corresponding reference symbols indicate corresponding parts, in which.

DETAILED DESCRIPTION

At the outset, it should be appreciated that like drawing numbers on different drawing views identify identical, or functionally similar, structural elements of the disclosure. It is to be understood that the disclosure as claimed is not limited to the disclosed aspects.

Furthermore, it is understood that this disclosure is not limited to the particular methodology, materials and modifications described and as such may, of course, vary. It is also understood that the terminology used herein is for the purpose of describing particular aspects only, and is not intended to limit the scope of the present disclosure.

Unless defined otherwise, all technical and scientific terms used herein have the same meaning as commonly understood to one of ordinary skill in the art to which this disclosure belongs. It should be understood that any methods, devices or materials similar or equivalent to those described herein can be used in the practice or testing of the disclosure.

Figure 1:
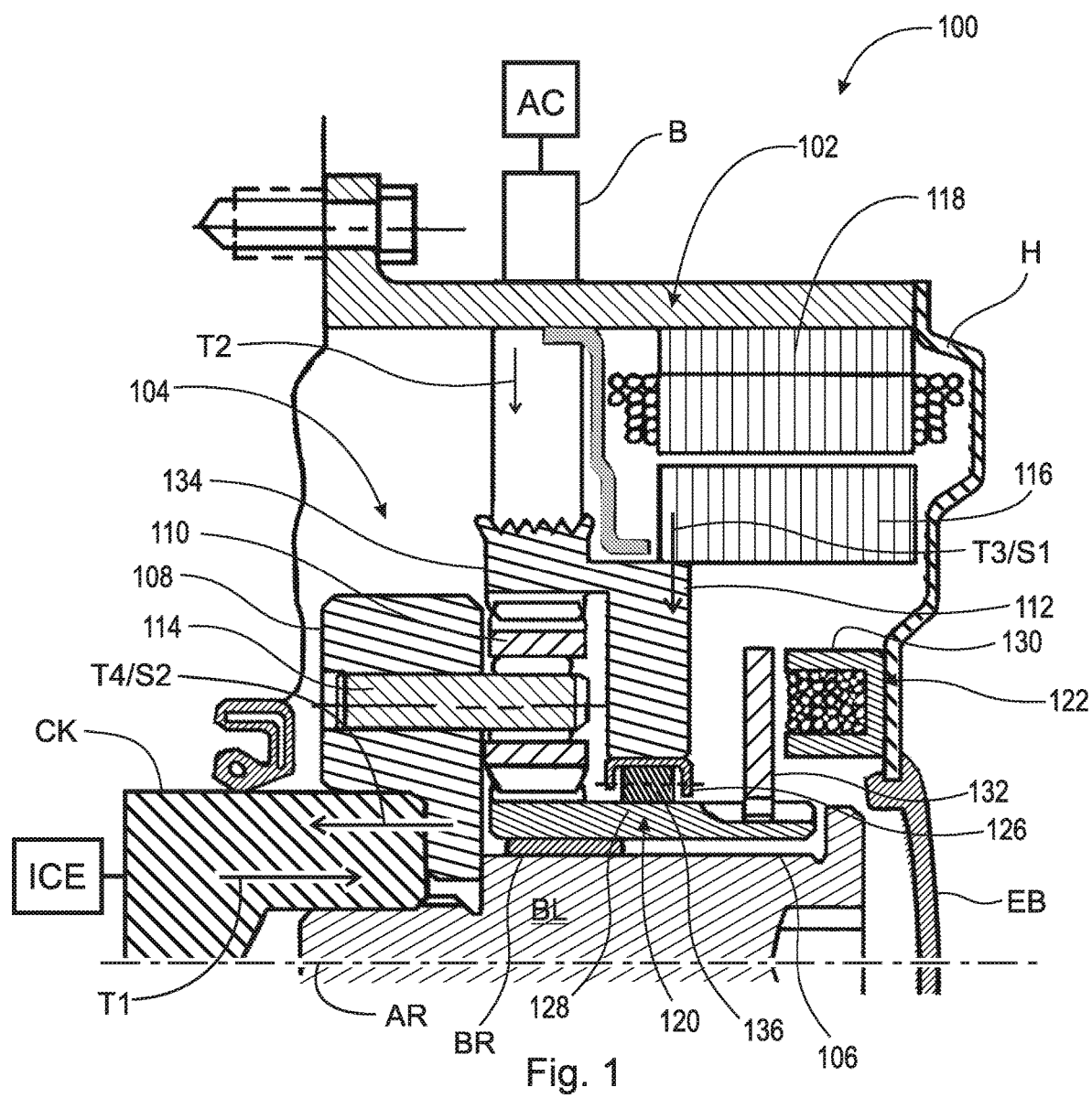
FIG. 1 is a cross-sectional view of an accessory drive.

FIG. 1 is a cross-sectional view of accessory drive 100. Drive 100 includes and planetary gear set 104. Gear set 104 includes: sun gear 106; planet carrier 108; at least one planet gear 110; and ring gear 112. Gear set 104 is arranged to be concentrically disposed around crankshaft CK of internal combustion engine ICE. Crankshaft CK is rotatable with respect to sun gear 106. Planet carrier 108 is arranged to non-rotatably connect to crankshaft CK, for example by bolt BL. Each planet gear 110: is connected to planet carrier 108 with a respective pin 114; is rotatable around the pin 114; and is meshed with sun gear 106 and ring gear 112. Gear set 104 is arranged to connect to electric motor/generator EMG, includes rotor R and stator S. Ring gear 112 is non-rotatably connected to rotor R, and is arranged to be directly connected a power transfer component for at least accessory AC. In the example of FIG. 1: the power transfer component is belt B. In an example embodiment, drive 100 includes electric motor/generator EMG.

By "non-rotatably connected" components, we mean that components are connected so that whenever one of the components rotates, all the components rotate; and relative rotation between the components is precluded. Radial and/or axial movement of non-rotatably connected components with respect to each other is possible. Components connected by tabs, gears, teeth, or splines are considered as non-rotatably connected despite possible lash inherent in the connection. The input and output elements of a closed clutch are considered non-rotatably connected despite possible slip in the clutch. The input and output parts of a vibration damper, engaged with springs for the vibration damper, are not considered non-rotatably connected due to the compression and unwinding of the springs.

In an example embodiment, bearing BR is arranged to be radially disposed between sun gear 106 and bolt BL to enable rotation of sun gear 106 with respect to bolt BL and around axis of rotation AR of crankshaft CK. In an example embodiment, bearing BR is a needle bearing. However, bearing BR can be any bearing known in the art, for example a roller bearing.

For a generator mode of accessory drive 100, crankshaft CK is arranged to transmit torque T1 to ring gear 112 to drive belt B to power at least one accessory AC and to operate electric motor/generator EMG as a generator. For a starting mode of accessory drive 100, electric motor/generator EMG is arranged to rotate planet carrier 108 to rotate crankshaft CK to start engine ICE. For a boost mode of accessory drive 100, electric motor/generator EMG is arranged to rotate planet carrier 108 to rotate crankshaft CK to add to the torque already present on crankshaft CK (engine ICE is running). For an accessory mode of accessory drive 100, electric motor/generator EMG is arranged to rotate ring gear 112, independent of crankshaft CK, to drive belt B. For example, crankshaft CK is not rotating to provide torque T1.

Accessory drive 100 includes one-way clutch 120 and clutch 122. Drive 100 is at least partially located within housing H. Housing H is a ground for drive 100. In the example of FIG. 1, housing H is arranged to non-rotatably connect to engine block EB. For example, stator 118 is fixed to housing H. Clutch 120 is connected to, or connects, sun gear 106 and ring gear 112. By a clutch connected to, or connecting, two or more components, we mean the clutch controls rotation between or among the components. Clutch 120 includes race 126 non-rotatably connected to ring gear 112. Portion 128 of sun gear 106 forms a second race of clutch 120. In an example embodiment (not shown), the second race of clutch 120 is a component not included in sun gear 106. In an example embodiment, drive 100 includes housing H.

Clutch 122 is arranged to connect to housing H and is connected to sun gear 106. For example: component 130 of clutch 122 is arranged to be non-rotatably connected to housing H; and component 132 of clutch 122 is non-rotatably connected to sun gear 106. Clutch 122 can be any clutch known in the art. In an example embodiment, clutch 122 is an electro-mechanical clutch.

The following is directed to the generator mode. Clutch 120 is arranged to be locked so that sun gear 106 and ring gear 112 are non-rotatably connected. Clutch 122 is arranged to be open to enable rotation of sun gear 106 around axis AR. Since sun gear 106 is not grounded, and sun gear 106 and ring gear 112 are non-rotatably connected, planetary gear set 104 acts as a solid mechanical unit and torque T1 is transmitted from crankshaft CK to ring gear 112 and rotor 116 at a 1:1 ratio. That is, torque T1, from crankshaft CK, is higher than accessory torque T2. By "solid mechanical unit" we mean that planet carrier 108, sun gear 106, and ring gear 112 rotate in unison and gear set 104 does not modify an input speed or input torque.

The following is directed to the starting mode. This mode is used to transmit torque T3 from electric motor/generator EMG to crankshaft CK to start internal combustion engine ICE. Clutch 122 is arranged to be closed to ground sun gear 106 to housing H. That is, sun gear 106 is rotationally fixed. Clutch 120 is arranged to free-wheel, or open, so that rotation between sun gear 106 and ring gear 112 is enabled, in particular, ring gear 112 is rotatable about sun gear 106 and planetary gear set 104 is operative. Electric motor/generator EMG is arranged to rotate ring gear 112 at speed S1 with torque T3. Gear set 104 modifies speed S1 and torque T3. For example, planet carrier 108 rotates at lower speed S2 and transmits higher torque 14 to crankshaft CK to start engine ICE. For the boost mode, engine ICE is running and torque 14 is added to T1.

The following is directed to the accessory mode. Clutch 120 is arranged to free-wheel, or open, so that rotation between sun gear 106 and ring gear 112 is enabled, in particular, ring gear 112 is rotatable about sun gear 106. Clutch 122 is arranged to be open to enable rotation of sun gear 106 about axis AR. Since sun gear 106 is not grounded, planet carrier 108 is not rotated by ring gear 112, and torque T3 is directly transmitted to belt B via ring gear 112.

In an example embodiment, ring gear 112 includes poly-V belt pulley 134 on its outside diameter, which enables connection of ring gear 112 to belt B. In an example embodiment, clutch 120 is a roller clutch including at least one roller 136. However, any one-way clutch known in the art, including but not limited to a sprag clutch, a ratchet clutch, and a wedge clutch can be used for clutch 120. In an example embodiment (not shown), clutch 122 is a wet friction clutch or a dry friction clutch, both of which enable more control of the engagement of clutch 122.

In an example embodiment, electric motor/generator EMG is air cooled. In an example embodiment (not shown), electric motor/generator EMG is water cooled or oil cooled. Electric motor/generator EMG can be any rotating electric motor/generator included in the art, including but not limited to a permanent magnet electric motor/generator, an induction electric motor/generator and a switched reluctance electric motor/generator.

Figure 2:
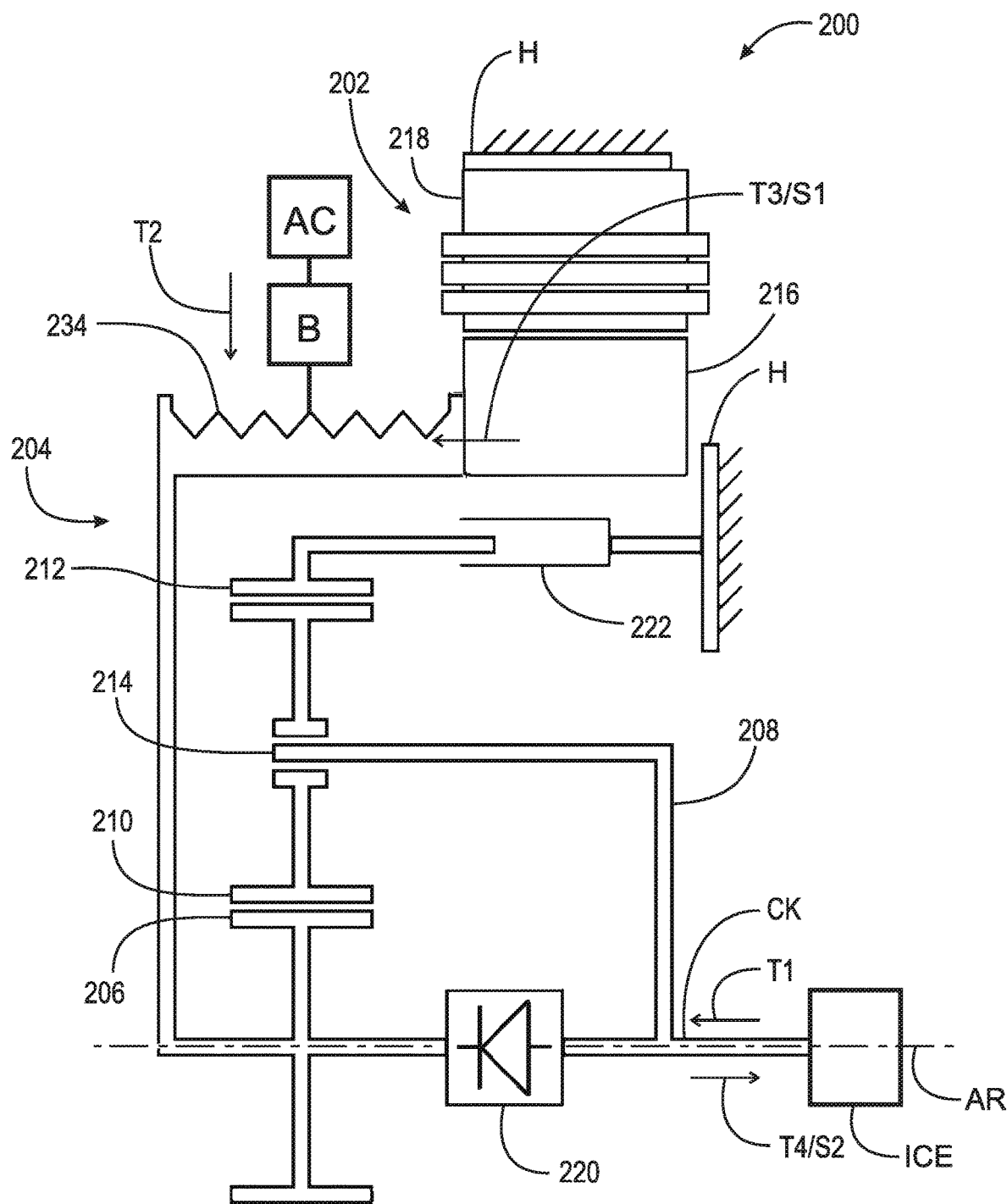
FIG. 2 is a schematic block diagram of an accessory drive.

FIG. 2 is a cross-sectional view of accessory drive 200. Drive 200 includes: planetary gear set 204. Gear set 204 includes: sun gear 206; planet carrier 208; at least one planet gear 210; and ring gear 212. Gear set 204 is arranged to be concentrically disposed around crankshaft CK of internal combustion engine ICE. Planet carrier 208 is arranged to non-rotatably connect to crankshaft CK. Each planet gear 210: is connected to planet carrier 208 with a respective pin 214; is rotatable around the pin 214; and is meshed with sun gear 206 and ring gear 212. Electric motor/generator 202 includes rotor 216 and stator 218. Sun gear 206 is arranged to non-rotatably connect to rotor R of electric motor/generator EMG, and is arranged to be directly connected a power transfer component for at least accessory AC. In the example of FIG. 2: the power transfer component is belt B. In an example embodiment, drive 200 includes electric motor/generator EMG.

For a generator mode of accessory drive 200, crankshaft CK is arranged to transmit torque T1 to sun gear 206 to drive belt B to power at least one accessory AC and to operate electric motor/generator 202 as a generator. For a starting mode of accessory drive 200, electric motor/generator 202 is arranged to rotate sun gear 206 to rotate crankshaft CK to start engine ICE. For a boost mode of accessory drive 200, electric motor/generator 202 is arranged to rotate sun gear 206 to rotate crankshaft CK to add to the torque already present on crankshaft CK (engine ICE is running). For an accessory mode of accessory drive 200, electric motor/generator 202 is arranged to rotate sun gear 206, independent of crankshaft CK, to drive belt B. For example, crankshaft CK is not rotating to provide torque T1.

Accessory drive 200 includes one-way clutch 220 and clutch 222. Drive 200 is at least partially located within housing H. Housing H is a ground for drive 200. For example, stator 218 is fixed to housing H. Clutch 220 is connected to sun gear 206 and to planet carrier 208 and is arranged to connect to crankshaft CK. Clutch 222 is connected to ring gear 212 and is arranged to connect to housing H. Clutch 222 can be any clutch known in the art. In an example embodiment, drive 200 includes housing H.

The following is directed to the generator mode. Clutch 220 is arranged to be locked so that sun gear 206, planet carrier 208, and crankshaft CK are non-rotatably connected. Clutch 222 is arranged to be open to enable rotation of ring gear 212 around axis AR. Since ring gear 212 is not grounded, and sun gear 206 and crankshaft CK are non-rotatably connected, planetary gear set 204 acts as a solid mechanical unit and torque T1 is transmitted from crankshaft CK to sun gear 206 and rotor 216 at a 1:1 ratio.

The following is directed to the starting mode. This mode is used to transmit torque T3 from electric motor/generator 202 to crankshaft CK to start internal combustion engine ICE. Clutch 222 is arranged to be closed to ground ring gear 212 to housing 224. That is, ring gear 212 is rotationally fixed. Clutch 220 is arranged to free-wheel, or open, so that rotation between sun gear 206 and planet carrier 208 is enabled and rotation between crankshaft CK and sun gear 206 is enabled. Since ring gear 212 is grounded, planetary gear set 204 is operative. Electric motor/generator 202 is arranged to sun gear 206 at speed S1 with torque T3. Gear set 204 modifies speed S1 and torque T3. For example planet carrier 208 rotates at lower speed S2 and transmits higher torque T4 to crankshaft CK to start engine ICE. For the boost mode, engine ICE is running and torque T4 is added to T1.

The following is directed to the accessory mode. Clutch 220 is arranged to free-wheel, or open, so that rotation between sun gear 206 and planet carrier 208 is enabled and rotation between crankshaft CK and sun gear 206 is enabled. Clutch 222 is arranged to be open to enable rotation of ring gear 212 around axis AR. Since ring gear 212 is not grounded, planet carrier 208 is not rotated by sun gear 206, and torque T3 is directly transmitted to belt B via sun gear 206.

In an example embodiment, ring gear 212 includes poly-V belt pulley 234 on its outside diameter, which enables connection of sun gear 206 to belt B. Clutch 220 can be any one-way clutch known in the art, including but not limited to a roller clutch, a sprag clutch, a ratchet clutch, and a wedge clutch. Clutch 222 can be any clutch known in the art.

In an example embodiment, electric motor/generator 202 is air cooled. In an example embodiment (not shown), electric motor/generator 202 is water cooled or oil cooled. Electric motor/generator 202 can be any rotating electric motor/generator included in the art, including but not limited to a permanent magnet electric motor/generator, an induction electric motor/generator and a switched reluctance electric motor/generator.

Accessory drives 100 and 200 solve at least the following three problems associated with known accessory drive:

1. Enable use of smaller accessories, which reduce load on the engine and, therefore, fuel consumption. Since a single speed drive cannot "overdrive" the accessories, the accessories must be sized to give the required output at the minimum speed. With a two-speed drive, the accessories are made to have a lower output and to meet unusual power demands with the higher speed ratio.

2. Enables an accessory mode in which accessories AC are driven by motor EMG or motor 202 when engine ICE is off and not providing torque T1. The accessory mode eliminates the need for individual electric motor/generators to drive each accessory AC when engine ICE is off.

3. Eliminates the use of a belt drive and associated tensioners connecting an off-axis starter-generator to the crankshaft, which are especially complex and expensive in belt starting alternator systems, because belt loads are higher than those for a normal alternator, and because the belt is loaded in both rotation directions for restarting the engine.

It will be appreciated that various of the above-disclosed and other features and functions, or alternatives thereof, may be desirably combined into many other different systems or applications. Various presently unforeseen or unanticipated alternatives, modifications, variations, or improvements therein may be subsequently made by those skilled in the art which are also intended to be encompassed by the following claims.

The invention claimed is:

1. An accessory drive, comprising:
   a planetary gear set including a plurality of components arranged to be concentrically disposed around a crankshaft of an internal combustion engine, the plurality of components including:
      a sun gear;
      a planet carrier;
      a ring gear; and,
      a planet gear meshed with the sun gear and the ring gear, wherein:
      the ring gear is configured to be non-rotatably connected to a rotor of an electric motor/generator; and, configured to be connected to a power transfer component for least one accessory; and
   the planet carrier is configured to be non-rotatably connected to the crankshaft; and,
   for a starting mode of the accessory drive, the electric motor/generator is arranged to:
      rotate the ring gear; and,
      rotate the planet carrier with respect to the ring gear.

2. The accessory drive of claim 1, wherein the accessory drive further comprising:
   a one-way clutch:
      connected to the ring gear; and,
      connected to the sun gear, wherein for the starting mode, the one-way clutch is arranged to free-wheel to enable rotation between:
      the ring gear and the planet carrier; or,
      the ring gear and the sun gear.

3. The accessory drive of claim 1, further comprising:
   a clutch:
   arranged to connect to a ground of the accessory drive; and,
   connected to the sun gear, wherein for the starting mode, the clutch is arranged to be closed to rotationally fix the sun gear.

4. The accessory drive of claim 1, further comprising:
   a one-way clutch including a first race connected to the ring gear; and,
   a clutch:
      arranged to connect to a ground of the accessory drive; and,
   connected to the sun gear, wherein for the starting mode:
      the one-way clutch is arranged to free-wheel to enable rotation of the ring gear; and,
      the clutch is arranged to be closed to rotationally fix the sun gear.

5. The accessory drive of claim 1, wherein for a generator mode of the accessory drive, the crankshaft is arranged to rotate, at a 1:1 torque ratio, the ring gear.

6. The accessory drive of claim 5, the accessory drive further comprising:
   a one-way clutch:
      connected to the ring gear; and,
      connected to the sun gear, wherein for the generator mode, the one-way clutch is arranged to non-rotatably connect:
      the ring gear and the planet carrier; or,
      the ring gear and the sun gear.

7. The accessory drive of claim 5, further comprising:
   a clutch:

arranged to connect to a ground of the accessory drive; and, connected to the sun gear, wherein for the generator mode, the clutch is arranged to be open to enable rotation of the sun gear.

8. The accessory drive of claim 1, wherein for an accessory mode of the accessory drive, the electric motor/generator is arranged to rotate the ring gear independent of the crankshaft.

9. The accessory drive of claim 8, the accessory drive further comprising:
a one-way clutch:
connected to the ring gear; and,
connected to the sun gear, wherein for the accessory mode, the one-way clutch is arranged to free-wheel to enable rotation between:
the ring gear and the planet carrier; or,
the ring gear and the sun gear.

10. The accessory drive of claim 8, further comprising:
a clutch:
arranged to connect to a ground of the accessory drive; and, connected to the sun gear, wherein for the accessory mode the clutch is arranged to be open to enable rotation of the sun gear.

11. The accessory drive of claim 1, the accessory drive further comprising:
a one-way clutch connected to the ring gear and to the sun gear; and,
a clutch:
arranged to connect to a ground of the accessory drive; and,
connected to the sun gear.

12. The accessory drive of claim 1, the accessory drive further comprising:
a one-way clutch connected to the ring gear and to the planet carrier; and,
a clutch:
arranged to connect to a ground of the accessory drive; and,
connected to the sun gear.

13. An accessory drive, comprising:
an electric motor/generator including a rotor; and,
a planetary gear set arranged to be concentrically disposed around a crankshaft of an internal combustion engine, the planetary gear set including:
a sun gear;
a planet carrier arranged to non-rotatably connect to the crankshaft;
a ring gear meshed with the planet carrier, non-rotatably connected to the rotor, and arranged to connect to a power transfer component for least one accessory; and,
a planet gear meshed with the sun gear and the ring gear,
wherein:
for a starting mode of the accessory drive, the electric motor/generator is arranged to:
rotate the ring gear at a first rotational speed; and,
rotate the planet carrier at a second rotational speed, different from the first rotational speed.

14. The accessory drive of claim 13, further comprising:
a one-way clutch connecting the sun gear and the ring gear; and,
a clutch connected to the sun gear and arranged to connect to a ground of the accessory drive, wherein for the starting mode:
the one-way clutch is arranged to free-wheel to enable rotation between the sun gear and the ring gear; and, the clutch is arranged to be closed to rotationally fix the sun gear.

15. The accessory drive of claim 13, further comprising:
a one-way clutch connecting the sun gear and the ring gear; and,
a clutch connected to the sun gear and arranged to connect to a ground of the accessory drive, wherein for a generator mode:
the one-way clutch is arranged to non-rotatably connect the sun gear and the ring gear; and,
the clutch is arranged to be open to enable rotation of the sun gear.

16. The accessory drive of claim 13, further comprising:
a one-way clutch connecting the sun gear and the ring gear; and,
a clutch connected to the sun gear and arranged to connect to a ground of the accessory drive, wherein for an accessory mode:
the one-way clutch is arranged to free-wheel to enable rotation between the sun gear and the ring gear; and,
the clutch is arranged to be open to enable rotation of the sun gear.

17. An accessory drive, comprising:
an electric motor/generator including a rotor; and,
a planetary gear set arranged to be concentrically disposed around a crankshaft of an internal combustion engine, the planetary gear set including:
a sun gear non-rotatably connected to the rotor and arranged to connect to a power transfer component for least one accessory;
a planet carrier arranged to non-rotatably connect to the crankshaft;
a ring gear meshed with the planet carrier; and,
a planet gear meshed with the sun gear and the ring gear,
wherein:
for a starting mode of the accessory drive, the electric motor/generator is arranged to:
rotate the sun gear at a first rotational speed; and,
rotate the planet carrier at a second rotational speed, different from the first rotational speed.

18. The accessory drive of claim 17, further comprising:
a one-way clutch connected to the sun gear and to the planet carrier; and,
a clutch connected to the ring gear and arranged to connect to a ground of the accessory drive, wherein for the starting mode:
the one-way clutch is arranged to free-wheel to enable rotation between the sun gear and the planet carrier; and,
the clutch is arranged to be closed to rotationally fix the ring gear.

19. The accessory drive of claim 17, further comprising:
a one-way clutch connected to the sun gear and to the planet carrier; and,
a clutch connected to the ring gear and arranged to connect to a ground of the accessory drive, wherein for a generator mode:
the one-way clutch is arranged to non-rotatably connect the sun gear and the planet carrier; and,
the clutch is arranged to be open to enable rotation of the ring gear.

20. The accessory drive of claim 17, further comprising:
a one-way clutch connected to the sun gear and the planet carrier; and, a clutch connected to the ring gear and arranged to connect to a ground of the accessory drive, wherein for an accessory mode:
   the one-way clutch is arranged to free-wheel to enable rotation between the sun gear and the planet carrier; and,
   the clutch is arranged to be open to enable rotation of the ring gear.

\* \* \* \* \*